UNITED STATES PATENT OFFICE.

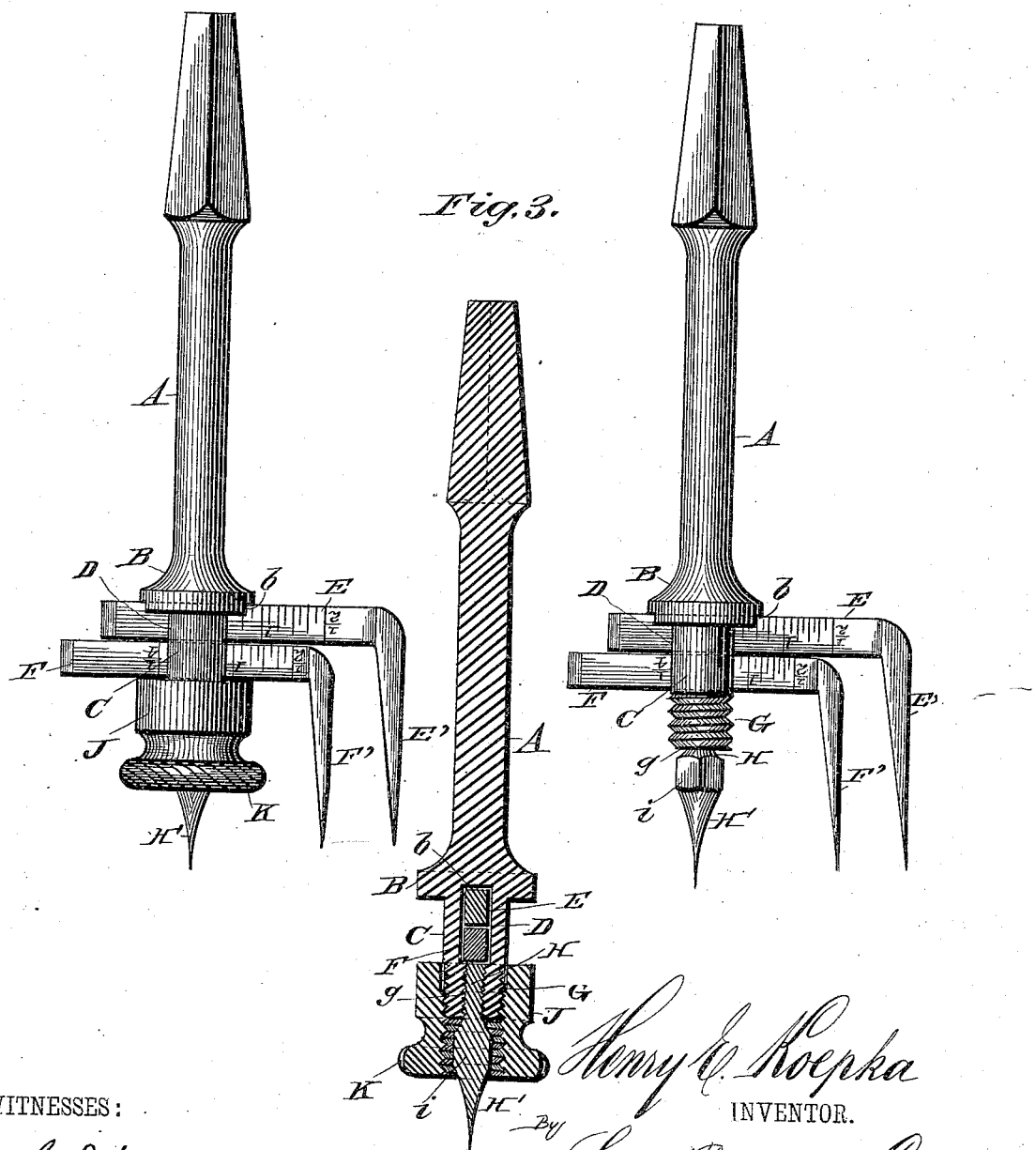

HENRY ERDMAN KOEPKA, OF ST. JOHNSBURY, VERMONT.

WASHER-CUTTER.

SPECIFICATION forming part of Letters Patent No. 310,527, dated January 6, 1885.

Application filed October 21, 1884. (No model.)

*To all whom it may concern:*

Be it known that I, HENRY E. KOEPKA, of St. Johnsbury, in the county of Caledonia and State of Vermont, have invented certain new and useful Improvements in Washer-Cutters; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved washer-cutter. Fig. 2 is a similar view of the same with the tubular binding-nut removed, and Fig. 3 is a vertical cross-section.

Similar letters of reference indicate corresponding parts in all the figures.

My invention has relation to that class of devices for cutting washers of leather, rubber, vulcanized fiber, or similar material in which two cutting-bits project from the ends of two arms sliding adjustably in a slot in the lower end of a shank; and it consists in the improved construction and combination of parts of the same, as hereinafter more fully described and claimed.

In the accompanying drawings, A denotes the stem or shank of the device, the upper end of which is squared off and made tapering, so that it may be inserted into the socket of an ordinary bit-brace. At the lower end of the stem A, and made in one piece therewith, is a flaring head or collar, B, which has a diametrical notch or recess, *b*, as shown in Fig. 3. The cylindrical part C below this head has a slot, D, for the insertion of the adjustable arms E and F of the cutting-bits E' and F', the lower end of the part C below the slot D being screw-threaded, as shown at G, and having a screw-threaded central socket, *g*, for the insertion of the threaded shank H of the steel point H', which has a squared head, *i*, so that it may be readily screwed into the socket and again removed by the use of a suitable key or a small wrench.

J is a tubular cylindrical nut, which has a milled flange, K. When this nut is screwed upon the threaded part G, it will press against the under side of the lowermost arm, F, and thus bind the arms E and F together, forcing the upper arm up into the transverse slot or recess *b* in the head B. This recessed head relieves the slotted part C from a great portion of the strain, that being the weakest part of the device.

If desired, the sliding and adjustable arms E and F may be provided with a scale, by means of which their proper relative position may easily be adjusted according to the size of washers which it is desired to cut.

From the foregoing description the manner of using this device will be readily understood without requiring extended explanation. By loosening the tubular nut J the bits may easily be adjusted in their proper relative position, after which the nut is again tightened down, so as to force the upper bit-arm up into the transverse recess in the head or enlargement at the lower end of the same. It will be seen that the tubular nut, being upon the lower end of the shank below the bit-arms and surrounding the pivotal point, the said nut will prevent the said point from being forced too far into the material from which the washer is cut, and by bearing with its lower end against the upper surface of the material it will support the shank in a vertical position, so as to cause the bits to cut the washer of a perfectly true circular shape, preventing any wabbling of the tool, whereby the cut might diverge from the true circular form. When the point H becomes dull, another one may be readily substituted for it.

Having thus described my invention, I claim and desire to secure by Letters Patent of the United States—

1. The combination of the stem or shank A, having slotted part C and screw-threaded end G, adjustable arms E and F, having bits E' and F', tubular nut J, having milled flange K, and removable point H, substantially as and for the purpose shown and set forth.

2. The combination of the stem or shank A, having the head or enlargement B, provided with transverse slot or recess *b*, and slotted part C, the slot D of which registers with the recess *b*, adjustable arms E and F, having bits E' and F', tubular nut J, having milled flange K, and removable point H, substantially as and for the purpose shown and set forth.

In testimony that I claim the foregoing as my own I have hereunto affixed my signature in presence of two witnesses.

HENRY ERDMAN KOEPKA.

Witnesses:
A. A. MASSEY,
WM. B. JOHNSON.